United States Patent
Smolic et al.

(10) Patent No.: US 9,552,520 B1
(45) Date of Patent: Jan. 24, 2017

(54) SYSTEMS AND METHODS FOR AUTOMATIC KEY FRAME EXTRACTION AND STORYBOARD INTERFACE GENERATION FOR VIDEO

(71) Applicants: Disney Enterprises, Inc., Burbank, CA (US); ETH Zürich (Eidgenössische Technische Hochschule Zürich), Zürich (CH)

(72) Inventors: Aljoscha Smolic, Aarau (CH); Marc Junyent Martin, Barcelona (ES); Jordi Pont-Tuset, Zurich (CH); Alexandre Chapiro, Zurich (CH); Miquel Angel Farre Guiu, Bern (CH)

(73) Assignees: Disney Enterprises, Inc., Burbank, CA (US); ETH Zurich, Zurich (CH)

(*) Notice: Subject to any disclaimer, the term of this patent is extended or adjusted under 35 U.S.C. 154(b) by 0 days.

(21) Appl. No.: 14/793,584

(22) Filed: Jul. 7, 2015

(51) Int. Cl.
  G06K 9/46      (2006.01)
  G06K 9/00      (2006.01)
  G06K 9/62      (2006.01)
  G06F 3/0484    (2013.01)

(52) U.S. Cl.
  CPC ....... G06K 9/00711 (2013.01); G06F 3/04842 (2013.01); G06K 9/4604 (2013.01); G06K 9/6218 (2013.01)

(58) Field of Classification Search
  None
  See application file for complete search history.

(56) References Cited

U.S. PATENT DOCUMENTS

| | | | |
|---|---|---|---|
| 2009/0199099 A1* | 8/2009 | Girgensohn | G11B 27/28 715/719 |
| 2013/0251274 A1* | 9/2013 | Xie | G06K 9/6202 382/218 |
| 2015/0319510 A1* | 11/2015 | Ould Dellahy, VIII | H04N 21/8545 725/32 |

* cited by examiner

*Primary Examiner* — Sumati Lefkowitz
*Assistant Examiner* — David Perlman
(74) *Attorney, Agent, or Firm* — Sheppard Mullin Richter & Hampton LLP

(57) ABSTRACT

A storyboard interface displaying key frames of a video may be presented to a user. Individual key frames may represent individual shots of the video. Shots may be grouped based on similarity. Key frames may be displayed in a chronological order of the corresponding shots. Key frames of grouped shots may be spatially correlated within the storyboard interface. For example, shots of a common group may be spatially correlated so that they may be easily discernable as a group even though the shots may not be temporally consecutive and/or or even temporally close to each other in the timeframe of the video itself.

18 Claims, 5 Drawing Sheets

SYSTEMS AND METHODS FOR AUTOMATIC KEY FRAME EXTRACTION AND STORYBOARD INTERFACE GENERATION FOR VIDEO

FIELD OF THE DISCLOSURE

This disclosure relates to automatic key frame extraction and storyboard interface generation for videos.

BACKGROUND

The use of video in reaching audiences has widened significantly in recent years, presenting a plethora of new video content as well as numerous ways to consume it. Efficiency in handling and visualizing such large amounts of video is becoming a vital prerequisite in the media sector, which may call for operational improvements in the creative and distribution processes behind video type media.

Within a video, a shot may refer to a video sequence captured from a unique camera perspective without cuts and/or other cinematic transitions. Improvements in navigation through video and content highlighting, such as user-selection of key frames or thumbnails for a given shot, may directly influence the time spent in production and/or content management. The selection and presentation of key frames of a video and/or thumbnails of the key frames, and/or other techniques for intuitive visualization of a video, may help to shape the viewing experience and may offer viewers a faster access to their desired content. For example, key frames and/or thumbnails, may be visually presented to a user in an interface including a one-dimensional timeline, often referred to as a "storyboard." Individual key frames and/or thumbnails may be positioned at locations on the timeline corresponding to their temporal order in the video. The users may be able to select individually presented key frames to "jump" to a shot in the video corresponding to the selected key frame and/or thumbnail.

SUMMARY

One aspect of the disclosure relates to a system configured for automatic key frame extraction and storyboard interface generation for video. In some implementations, individual shots of a video may be determined. Individual shots may be grouped together based on feature similarity. A storyboard interface may be configured to display key frames of shots from the video. Key frames may be displayed in chronological order of the corresponding shots. To further assist a user producing and/or managing the video, key frames of grouped shots may be spatially correlated within the storyboard interface. For example, shots of a common group may be spatially correlated within a two-dimensional array so that they may be easily discernable as a group even though the shots may not be temporally consecutive and/or or even temporally close to each other in the timeframe of the video itself. By way of non-limiting example, in one or more implementations a storyboard interface may comprise a two-dimensional array, including a time-dependent dimension and a group-dependent dimension facilitating spatial correlation of key frames both temporally and based on groups.

In some implementations, the system may include one or more physical processors that are configured by machine-readable instructions. Executing the machine-readable instructions may cause the one or more physical processors to automatically extract key frames from video and generate a storyboard interface. The machine-readable instructions may include one or more of a shot component, a feature component, a group component, a key frame component, a storyboard component, and/or other components.

The shot component may be configured to obtain videos having multiple frames. The shot component may be configured to identify discrete shots in individual videos. A given shot of a given video may include consecutive frames of the video associated with a sequence that was captured from a unique camera perspective without cuts and/or other cinematic transitions. By way of non-limiting example, a first video having a first set of frames may be obtained. The shot component may be configured to identify a first shot, a second shot, and/or other shots of the first video.

The feature component may be configured to determine features of individual frames. By way of non-limiting example, features of an individual frame may include one or more of a size, position, and/or angle of individual faces depicted in the frame; a state of a mouth and/or eyes of a given face; a role assigned to a living being; text displayed; an image quality; a perspective of a video recording device capturing an image corresponding to a given frame; one or more actions that may be taking place; one or more background features and/or other characteristic feature points; and/or other features. By way of non-limiting example, actions may include one or more of explosions, car chases, and/or other action sequences. By way of non-limiting example feature may be detected by one or more feature detection techniques including one or more of SURF, SIFT, and/or other techniques. In some implementations, the feature component may be configured to determine a first feature and/or other features of a first frame of the first shot, a second feature and/or other features of a second frame of the second shot, and/or other features of other shots of the first video.

The group component may be configured to determine one or more groups of shots for individual videos based on the determined features. By way of non-limiting example, a given group may include one or more shots of a given video that share similar features. In some implementations, the group component may be configured such that the first shot may be assigned to a first group based on the first feature and/or other features of the first shot being similar to features of other shots assigned to the first group. The group component may be configured such that the second shot may be assigned to a second group based on the second feature and/or other features of the second shot being different from the first feature and/or other features of shots assigned to the first group. The group component may be configured to assign other shots of the first video to the first group, second group, and/or other groups.

The key frame component may be configured to select individual key frames representative of the individual shots. By way of non-limiting example, the key frame component may be configured such that the first frame may be selected as a first key frame of the first shot, the second frame may be selected as a second key frame of the second shot, and/or other frames of other shots of the first video may be selected as key frames of the other shots of the first video.

The storyboard component may be configured to effectuate presentation of the key frames in a storyboard interface. The storyboard interface may display the key frames in a chronological order of the corresponding shots. Key frames of grouped shots may be spatially correlated within the storyboard interface. By way of non-limiting example, the storyboard component may be configured to effectuate presentation of the first key frame, the second key frame, and/or other key frames of the first video in the first storyboard interface. The first key frame and/or other key frames of other shots assigned to the first group may be spatially correlated within the display of the first storyboard interface.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
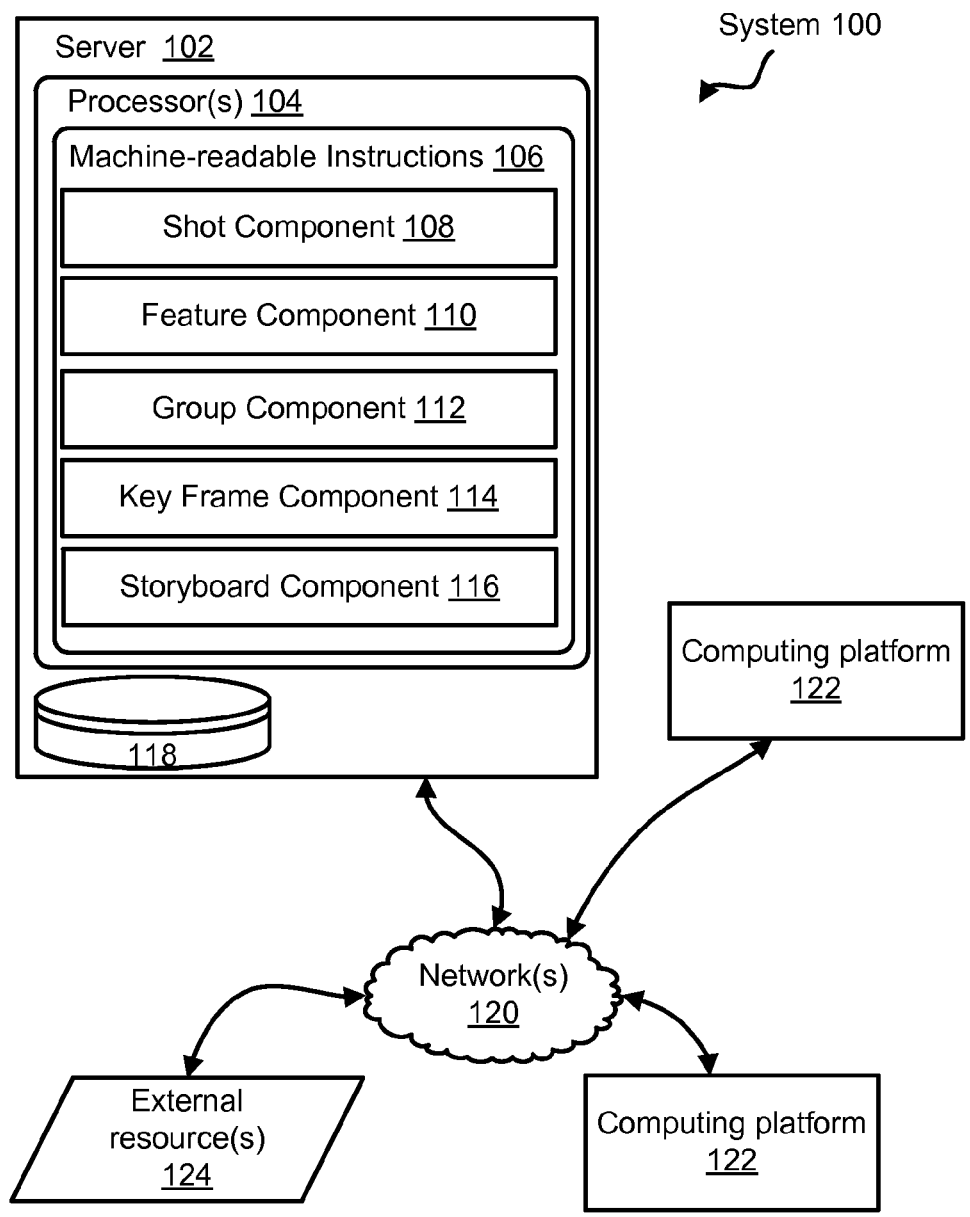
FIG. 1 illustrates a system configured for automatic key frame extraction and storyboard interface generation for video, in accordance with one or more implementations.

FIG. 1 illustrates a system 100 configured for automatic key frame extraction and storyboard interface generation for videos, in accordance with one or more implementations. A video may comprise a series of still images that may be presented in rapid succession to cause an appearance of movement of object, actors, and/or other elements portrayed in the images. A given image may correspond to a given frame of the video. A video may have multiple frames that individually correspond to an image, a sound track, and/or other components. A video may be a recorded video, a live video feed, and/or other audiovisual asset.

In some implementations, the system 100 may comprise a server 102, one or more computing platforms 122, and/or other components. The server 102 may include one or more physical processors 104 configured by machine-readable instructions 106 to automatically extract key frames from a video and/or generate a storyboard interface corresponding to that video. The machine-readable instructions 106 may include one or more of a shot component 108, a feature component 110, a group component 112, a key frame component 114, a storyboard component 116, and/or other components. In some implementations, the server 102 may be configured to provide remote hosting of the features and/or function of the machine-readable instructions 106 to one or more computing platforms 122 that may be remotely located from the server 102. In some implementations, one or more features and/or functions of server 102 may be attributed as local features and/or functions of one or more computing platforms 122. By way of non-limiting example, individual ones of the computing platforms 122 may include machine-readable instructions comprising the same or similar components as machine-readable instructions 106 of server 102. The computing platforms 122 may be configured to locally execute one or more components of the machine-readable instructions 106.

The computing platforms 122 may include one or more of a cellular telephone, a smartphone, a laptop, a tablet computer, a desktop computer, a television set-top box, smart TV, a gaming console, and/or other computing platforms.

In some implementations, the shot component 108 may be configured to obtain videos, identify discrete shots in individual videos, and/or perform other functions. In some implementations, the shot component 108 may be configured to obtain video locally from server 102 (e.g., electronic storage 118), from one or more computing platforms 122 over network 120, and/or from other sources.

In some implementations, a given shot of a given video may include consecutive frames of the video. The consecutive frames may be associated with a sequence that may have been captured from a unique camera perspective without cuts and/or other cinematic transitions.

In some implementations, identifying one or more discrete shots of a given video may be based on detecting shot boundaries and/or other techniques. Shot boundaries of a given shot may include one or more of a starting frame of the shot, an ending frame of the shot, and/or other frames associated with a given shot. In some implementations, the shot component 108 may be configured to determine starting and/or ending frames based on triggers in a video and/or other information. The shot component 108 may be configured to detect one or more triggers. A trigger may include one or more of a fade-in transition, a fade-out transition, an abrupt cut, a dissolve transition, and/or other trigger associated with a shot boundary. In some implementations, detecting triggers may be accomplished using image processing techniques such as comparing one or more frames within a given time window to determine an occurrence of significant changes (e.g., changes indicative of a trigger occurring), and/or other techniques configured to detect one or more triggers. By way of non-limiting example, detecting one or more change may be accomplished by using a histograms of color for individual frames, direct comparison of frames, detecting chaotic optical flow, and/or other techniques for detection changes that may be indicative of a trigger occurring.

In some implementations, the shot component 108 may be configured such that shots may be identified based on rank-tracing techniques and/or other techniques. By way of non-limiting example, rank-tracing may be accomplished by determining a histogram of frames of a video based on a hue-saturation-value (HSV) color space model of individual frames, a hue-saturation-lightness (HSL) color space model of individual frames, and/or based on other techniques for representing an RGB color model of a frame.

Figure 2:
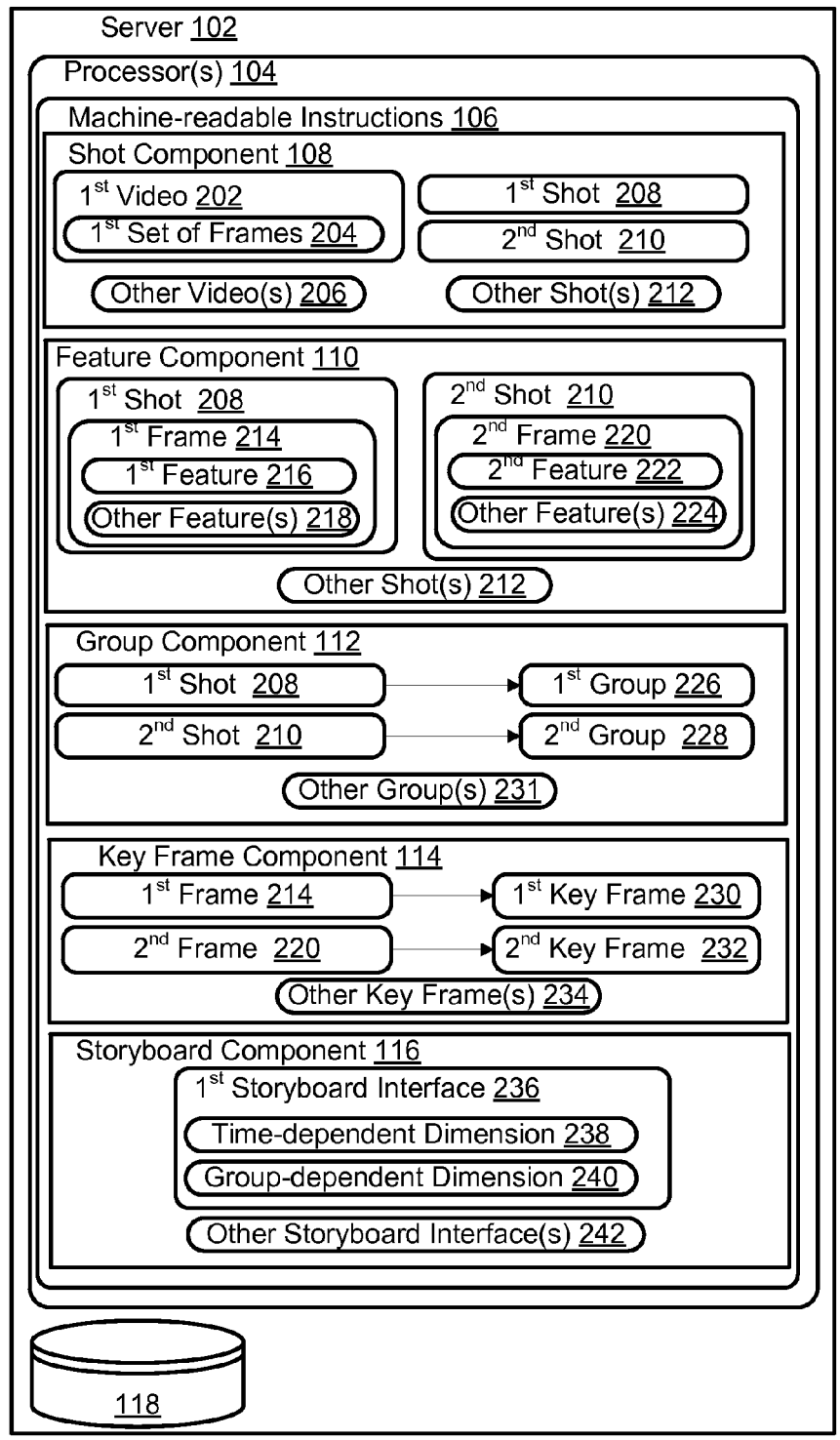
FIG. 2 illustrates an implementation of a server employed in the system of FIG. 1.

By way of non-limiting illustration in FIG. 2, the shot component 108 may be configured to obtain a first video 202 and/or other videos 206. The first video 202 may have a first set of frames 204. The shot component 108 may be configured to identify a first shot 208, a second shot 210, and/or other shots 212 of the first video 202. By way of non-limiting example, the first shot 208 may comprise a first subset of the first set of frames 204. By way of non-limiting example, the second shot 210 may comprise a second subset of the first set of frames 204. The first subset may be different than the second subset.

The feature component 110 may be configured to determine features of individual frames. By way of non-limiting example, features of an individual frame may include one or more of a relative size, position, and/or angle of one or more individual faces depicted in the frame; a state of a mouth and/or eyes of a given face; text displayed; an image quality; a perspective of a video recording device capturing an image corresponding to a given frame (also referred to as camera pose); one or more actions that may be taking place; one or more background features and/or other characteristic feature points; and/or other features. By way of non-limiting example, actions may include one or more of explosions, car chases, and/or other action sequences. By way of non-limiting example, features may be detected by one or more feature detection techniques including one or more of SURF, SIFT, and/or other techniques.

In some implementations, the feature component 110 may be configured to detect one or more faces in individual frames and/or track individual faces over one or more frames of a given shot. Tracking may comprise correlating detections of text within different frames and/or other techniques. Face detection and/or tracking may be accomplished using object recognition, pattern recognition, searching for a specific pattern expected to be present in faces, and/or other image processing techniques. By way of non-limiting example, a specific pattern of a given face may include one or more of a predetermined positioning of eyes, nose, mouth, and/or other body parts, and/or other patterns. For example a predetermined positioning may comprise symmetric positioning. By way of non-limiting example, face detection and/or tracking may be accomplished using a sophisticated high-speed object recognition engine (SHORE), Viola-Jones object detection framework, and/or other techniques.

In some implementations, for individual detected faces, the feature component 110 may be configured to determine its relative position, size, and/or angle with respect to the camera; a state of the mouth and/or the eyes; an approximated age; a gender of the actor; a mood of the actor; and/or other features of a given face. Such determinations may be based on the SHORE technique, Viola-Jones object detection framework, and/or other techniques. A state of eyes may correspond to one or more of a whether the eyes are open, closed, winking, and/or in other states; a direction of gaze; and/or other state information. A state of a mouth may correspond to whether the mouth is open, closed, smiling, frowning, and/or in other state; a degree of "openness"; and/or other state information.

In some implementations, an image quality of a given frame may correspond to one or more of a presence of image artifacts, a resolution and/or blurriness measure, a palette of colors present, and/or other quality information.

In some implementations, the feature component 110 may be configured to determine which of the one or more detected faces may be classified as important in a given frame. In some implementations, importance may correspond to a person's role in the video and/or other measure of importance. A role may include one or a speaker, a listener, a primary actor, a secondary actor, a background actor, a temporary or transient actor, an audience member, and/or other roles.

In some implementations, an importance measure of a face may be determined based on various features of the given face, weighting placed on individual features of the face, and/or other information. In some implementations, one or more features of a face may include the determined relative position, size, and/or angle of a given face respect to the camera; the state of the mouth and the eyes; whether the face is detected over multiple frames; and/or other features.

By way of non-limiting example, a video may include one or more persons speaking, one or more persons listening, one or more persons spectating, and/or other features. A given speaker and/or a given listener may be depicted in a given frame as being positioned closer to the camera relative to one or more spectators. By way of non-limiting example, the spectators may be positioned in the background of a scene. As such, the given speaker and/or given listener may have face sizes that may be relatively larger than the face sizes of the one or more spectators (due to their positioning with respect to camera location). The feature component 110 may be configured to determine that the detected faces of the given speaker and/or listener may have a greater importance than the detected faces of the one or more spectators.

It is noted that the above example of a video including one or more persons speaking, one or more persons listening, and/or one or more persons spectating is not to be considered limiting. Instead, this is merely for illustrative purposes of describing an implementation wherein one or more features of detected faces (e.g., relative size) may correspond to a given importance classification of the given faces. It is not to be considered limiting with respect to how features are detected, the weighting assigned to those feature for classifying the faces, and/or how the faces may be classified.

In some implementations, a given face may be detected over multiple frames. Detected instances of a given face over multiple frames may be referred to collectively as a "family" of faces and/or other term. Family determination may facilitate providing a temporal coherence of the face detections over multiple frames. In some implementations, importance of a given face in a given frame may be determined based on importance scores assigned to the corresponding family of the given face and/or other information. Importance scores of a family may be determined based on individual feature score determined for individual detected faces in that family and/or overall family features such as a time duration of the presence of the family, and/or other features. In some implementations, if the number of families of detected faces of a given shot is below a given threshold, one or more of the faces associated with the families may initially and automatically be determined as important. After determining importance scores for families, the families with low score outliers may be determined as unimportant. In some implementations, if the number of families is above a threshold, one or more families with top score outliers may be determined as important while other ones of the families may be determined as unimportant. By way of non-limiting example, the following technique and/or other techniques for determining importance for individual families of detected faces may be used.

In some implementations, individual faces may be represented by $f_{jk}$, where j represents the frame (e.g., a frame number) and k designates the individual face (e.g., a whole number starting from 1). Faces may be grouped into families per shot, represented as $F_i$, where "i" designates the family (e.g., a whole number starting from 1). In some implementations, to determine an importance score per family, the following feature scores for a given family may be determined: a quality or flattery score $Q(f_{jk})$; a position score $P(f_{jk})$; a distance score $D(f_{jk})$; a size score $M(f_{jk})$, and/or other scores. In some implementations, the feature scores at the family level may be determined based on a mean and/or other measure of corresponding feature scores determined for individual faces of that family.

In some implementations, a quality or flattery score of a given face may be determined based on a relative angle of a face and/or head, a state of the eyes and/or mouth, a reliability factor, and/or other information. In some implementations, the position score may be determined based on a two-dimensional position of a given face within the image plane of the given frame. In some implementations, the distance score may be determined based on a mean distance of a given face to one or more other faces in the same frame. In some implementations, the size score may be determined based on a size of a given face relative to sizes of one or more other faces in the same frame. In some implementations, the individual feature scores of the individual faces of a given family may be normalized between 0 and 1, where 1 may represent a target or "best" score. The individual feature scores of individual faces that belong to the given family may be averaged to determine the features scores at the family level.

In some implementations, the final importance score, $S(F_i)$, of a given family of faces may be calculated as:

$$S(F_i) = w_1 Q(F_i) + w_2 D(F_i) + w_3 M(F_i) +$$
$$w_4\left(P(F_i) + \frac{1}{\text{(number of Families)}} \sum_{f \in F_i} (P(f) - P(F_i))^2\right) +$$
$$w_5\left(\frac{\text{length}(F_i)}{\text{length(Shot)}} - \frac{\text{(number of Families)}}{\text{length}(F_i)}\right)$$

The term $w_i$ may represent weights used to change the relative importance of the different scores. The total score $S(F_i)$ may be normalized. Top and/or bottom outliers may be determined based on the normalized scores.

It is noted that the above description of feature scores and importance scores for individual face detections and/or for families of face detections is provided for illustrative purposes only and is not to be considered limiting. For example, the calculations of feature scores and/or importance scores is not to be considered limiting with respect to how faces may be detected, how roles may be assigned and/or determined for individual faces, how a face is determined as "important," and/or how features of a given frame may be determined and/or evaluated.

In some implementations, the feature component 110 may be configured to detect text displayed in individual frames. In some implementations, text (e.g., a sentence and/or other text string) may be detected using text detection techniques and/or other techniques. By way of non-limiting example, a text detection technique may include Stroke Width Transform (SWT), high frequency analysis of the image including refinement stages based on machine learning, and/or other techniques.

In some implementations, a given string of text may be detected over multiple frames. The detected instances of a given text string over multiple frames may be referred to collectively as a "family" of text strings and/or other term. Family determination may facilitate providing a temporal coherence of the text detections over multiple frames. By way of non-limiting example, the following technique and/or other techniques for detecting text strings and/or determining text string families may be utilized.

In some implementations, "S" may denote a set of shots of a video, where $S=\{S_1, S_2, \ldots, S_n\}$. Individual shots $S_i$ may comprise a set of frames f, where $S_i=\{f_1, \ldots, f_{m_i}\}$. For individual shots $S_i$, a set of text strings $B_i$ may be detected, wherein $B=\{b_{jk}: 1 \leq j \leq m_i, k \geq 0\}$, and $m_i$ is the number of the frames in a shot. A text string family may be denoted as $T_i$. A text string family may contain the same or similar text strings detected across one or more frames of a shot. In some implementations, a given text string may not be part of more than one family. In some implementations, a given family may not be associated with more than one text string detected in a given frame. Text stings may be assigned to a given family based on one or more of similar spatial position within consecutive frames, size within consecutive frames, and/or other factor for assigning text strings to a given family. By way of non-limiting example, if a given text string $b_{jk}$ is assigned to a given family $T_j$, then one or more other given text strings $b_{j'k'}$ with a same or similar spatial position and/or size similar to $b_{jk}$, may be assigned to the same given family.

In some implementations, a length of a family length($T_i$) may comprise a frame spacing between a frame where a text string was first detected and a frame where the text string is last detected. It may be desired to remove incorrectly determined families. By way of non-limiting example, a family having length($T_i$)<$t_2$ and/or $$\frac{\#T_i}{\text{length}(T_i)} < t_3$$

may be considered false positives, and/or may be discarded. The "#" term may refer to the number of strings in a given family. Once false positives have been discarded, families that may be close in time (frames) and/or spatial position may be merged.

In some implementations, to ensure the temporal continuity of one or more text strings within a family, one or more proxy text strings may be generated in frames wherein a text string for a given family may not have been detected. Generating proxies may comprise determining if one or more text strings of a given family is static or moving. In some implementations, if the text is static, one or more proxy text strings may be generated that comprise one or more previous text strings of the family. In some implementations, if the text is moving, one or more proxy text strings may comprise an interpolation between a previous existing text string and a subsequent existing text string in the given family.

In some implementations, the feature component 110 may be configured such that information (e.g., features, roles of faces, face and/or text family determinations, and/or other information) determined for a given shot may be used for other shots that may be determined to belong to a common group. By way of non-limiting example, determinations made by the feature component 110 and/or other components for a given shot may be saved and used to perform batch operations for other shots in a common group. Batch operations may server to reduce computational load, time, and/or provide other advantages.

By way of non-limiting illustration, in FIG. 2, the feature component 110 may be configured to determine a first feature 216 and/or other features 218 of a first frame 214 of the first shot 208, a second feature 222 and/or other features 224 of a second frame 220 of the second shot 210, and/or other features of other shots 212 of the first video 202.

Figure 3:
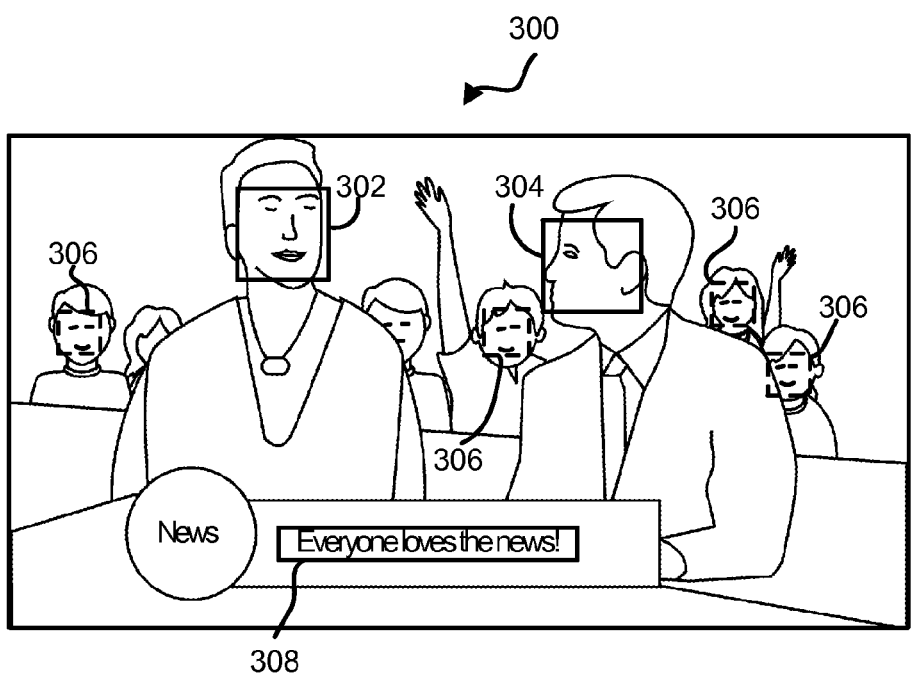
FIG. 3 illustrates a detection of text and/or face features displayed in an individual frame of a video, in accordance with one or more implementations.

By way of non-limiting example in FIG. 3, exemplary implementations of feature detections for a given frame 300 of a video are depicted. The frame 300 may include an image depicting one or more actors, objects, overlaid text, and/or other features. In some implementations, feature detections may be represented by bounding boxes placed over a corresponding feature. By way of non-limiting example, the feature detections may be associated with a first bounding box 302 that corresponds to a first face detection in frame 300, a second bounding box 304 that corresponds to a second face detection in the frame 300, a set of bounding boxes 306 that correspond to one or more other face detections in the frame 300, a third bounding box 308 that corresponds to a first text detection in the frame 300, and/or other feature detections. The first bounding box 302, second bounding box 304, third bounding box 308, and/or other bounding boxes depicted by a solid line may represent corresponding features (e.g., faces, text, and/or other features) that may be determined as important (e.g., a lead speaker, news anchor, a headline, and/or other feature determined as important). The set of bounding boxes 306 and/or other bounding boxes depicted by a dashed line may represent corresponding faces that may be determined as unimportant (e.g., background and/or transient actors in the frame).

Returning to FIG. 1, the group component 112 may be configured to determine one or more groups of shots for individual videos. Individual groups of shots may be determined based on features of the shots and/or other information associated with the shots. By way of non-limiting example, a given group may include one or more shots of a given video that may share similar features. This may include, for example, shots portraying the same persons, actions, environments (e.g., based on similarly detected objects in a shots, such as a building and/or other objects), and/or other similar features.

By way of non-limiting example, in a video of an interview, the video may comprise shots that alternate between a set of shots focusing on the interviewer and another set of shots focusing on the interviewee. The group component 112 may be configured to group together shots that focus on the interviewer into one given group, while grouping together shots that focus on the interviewee into another given group. It is noted that the above description of an interview video is provided for illustrative purposes only and is not to be considered limiting. For example, this should not be considered limiting with respect to the shots of a video; the objects, actors, and/or other content portrayed in the video; and/or how shots may be grouped based on similarity.

In some implementations, the group component 112 may be configured such that determining one or more groups of shots may include determining a similarity of features between pairs of shots, assigning similar pairs of shots to a common group, and/or assigning dissimilar pairs to separate groups. Pairwise similarity may be determined until one or more of the shots of a video may be either assigned to a group including one or more other shots and/or assigned to its own group (e.g., due to being dissimilar from the other shots of the video).

In some implementations, similarity between shots may be determined based on comparing determined features of sample frames selected from individual shots and/or other techniques for determining shot similarity. By way of non-limiting example, the group component 112 may be configured such that determining similarity between pairs comprises one or more of: selecting one or more sample frames from individual shots; comparing features of selected one or more sample frames between a given pair of shots; determining, based on the comparison, whether the given pair of shots are similar; and/or other operations. In some implementations, the group component 112 may be configured such that based on a comparison of features of respective one or more sample frames of the given pair of shots conveying similarity, the given pair of shots may be assigned to a given group. In some implementations, the group component 112 may be further configured such that, based on a comparison of features of respective one or more sample frames of the given pair of shots conveying dissimilarity, individual shots in the given pair may be assigned to separate groups.

In some implementations, the group component 112 may be configured to select one or more sample frames from individual shots. The sample frames may be selected based on a sampling frequency, randomly, following predetermined distributions, and/or based on other sampling parameters. By way of non-limiting example, sample frames may be selected from every $10^{th}$ frame, $20^{th}$ frame, and/or other sampling frequency. By way of non-limiting example, a predetermined distribution may include selecting one or more frames from a given temporal segment of the shot including one or more of a middle segment, begging segment, ending segment, and/or other segments.

The group component 112 may be configured to determine a measure of similarity between two shots based on the similarities of the selected sample frames. By way of non-limiting example, the group component 112 may be configured to compare features of one or more frames of individual shots to one another. The group component 112 may be configured to assign a similarity measure and/or measures based on the comparison. For example, if a frame of a first shot shares the same feature of another shot, then the pair of shots may be assigned a point value and/or other similarity measure. The final similarity measure between a pair of shots may be the total value of points assigned. In some implementations, a threshold point value may be determined such that total point values assigned to a pair of shots that may be above the threshold may be determined as belonging to the same group. On the other hand, total point values assigned to a pair of shots that may be below the threshold may be determined as belonging to different groups.

The above description of point value assignment for similarity measures is provided for illustrative purpose only and is not to be considered limiting. For example, this is not to be considered limiting with respect to how features of pairs of shots may be compared and/or how a similarity measure may be determined based on a comparison. By way of non-limiting example, similarity measures may be numerical (e.g., points, amount, score, rank, ratings, place, grades, or any other type of numerical value), descriptive (e.g., "good match," "great match," "bad match," "worst match," and/or other description), progressive (e.g., high, medium, low, and/or other description), pictorial (e.g., a thumbs up, a thumbs down, and/or other imagery), and/or any other type of expression representing a measure of similarity between shots. In some implementations, a similarity measure may be normalized such that a value of "1" may describe two shots that may belong to the same group.

In some implementations, the group component 112 may be configured such that determining groups of shots may be based on compiling an undirected graph and/or by other techniques. By way of non-limiting example, an undirected graph may be complied such that a given vertex may represent a given shot and/or a given edge may be weighted based on a determined similarity measure. The weights may be viewed as the probability of going from one vertex to another. The group component 112 may be configured to group one or more vertices in the graph using an unsupervised cluster algorithm for graphs based on simulation of flow. By way of non-limiting example, this may provide a technique to assign the vertices into groups. This may include one or more of a Markov Cluster Algorithm, affinity propagation, DBSCAN, and/or other clustering technique used to determine groups. By varying one or more parameters of the algorithm and/or by using a cutoff threshold, the group component 112 may be configured to control a granularity of the clustering for determining shot groups.

By way of non-limiting illustration in FIG. 2, the group component 112 may be configured such that the first shot 208 may be assigned to a first group 226, the second shot 210 may be assigned to a second group 228, and/or other shots may be assigned to one or more other groups 231. In some implementations, the assignment of the first shot 208 to the first group 226 may be based on the group component 112 selecting the first frame 214 as a sample frame of the first shot 208. The assignment of the first shot 208 to the first group 226 may be further based on the first feature 216 of the first frame 214 and/or other features of the first shot 208 being similar to features of other shots assigned to the first group 226. In some implementations, the assignment of the second shot 210 to the second group 228 may be based on the group component 112 selecting the second frame 220 as a sample frame of the second shot 210. The group component 112 may be configured such that the assignment of the second shot 210 to the second group 228 may be further based on the second feature 222 of the second frame 220 and/or other features of the second shot 210 being different from the first feature 216 and/or other features of shots assigned to the first group 226. The group component 112 may be configured to assign other shots of the first video 202 to the first group 226, second group 228, and/or one or more other groups 231.

Returning to FIG. 1, the key frame component 114 may be configured to select individual key frames for individual shots. A given key frame may comprise a frame of a given shot that best represents one or more features determined for one or more frames of the given shot. By way of non-limiting example, a key frame may comprise a frame of a shot that includes one or more of a target image quality, a target face detection, a target text detection, and/or other target features. For example, a "target" feature may correspond to the given feature meeting and/or exceeding a predetermined quality of the given feature. In some implementations, a target feature may be a feature that "best" represents the features of a given group. By way of non-limiting example, a frame may be selected as a key frame based on one or more of the image quality, face detection(s), text detection(s), and/or other features of the frame meeting and/or exceeding predetermined target values for one or more of these features. Key frames may be selected in other ways.

In some implementations, a target image quality frame may comprise a frame with no or few artifacts, blurriness, and/or others aspects that may negatively affect an image quality. In some implementations, a target face detection may be associated with a frame that depicts one or more important faces as determined by the feature component 110. A target face detection may further be associated with a frame that depicts an important face having a target size, target position, and/or target angle of the face; a target state of a mouth and/or eyes; and/or other target features. For example, a target size of a face may a given percentage of an area of a given frame image. A given percentage may be in the range of 10 to 80% of an area of a two-dimensional plane of a given frame image and/or other range. By way of non-limiting example, a target size may be a face that appears proportionally larger than other faces due to the positioning of an actor to a camera capturing an image. A target position may be associated with a given face being positioned in a central location on the frame, a given distance from one or more edges of the frame, a given distance between other faces, and/or other target position. A target angle of the face may be associated with the face being shown in a profile view with respect to camera, plan view with respect to the camera, and/or angle of the face. A target state of a mouth may be closed, smiling, frowning, and/or other states. A target state of the eyes may be open, winking, closed, a direction of gaze, and/or other state.

In some implementations, the key frame component 114 may be configured such that determining key frames comprises determining frame scores for individual frames. Frame scores may be determined based on one or more features of a given frame, and/or other information. By way of non-limiting example, frame scores may be determined based on feature scores determined by the feature component 110, information associated with one or more text string detections, and/or other information. By way of non-limiting example, frame scores may be determined based on one or more of a quality or flattery score, a position score, a distance score, a size score, and/or other scores determined by the feature component 110 and/or other information.

In some implementations, a given frame score may convey a quality of the features of a given frame of a given shot relative the features of one or more other frames of the given shot. The frame scores may be utilized to determine if a given frame may best represent a corresponding shot as a key frame of the shot.

By way of non-limiting example, the following technique and/or other techniques for selecting key frames may be utilized. In some implementations, for each frame j, $1 \leq j \leq n$ ("n" denoting the last frame of a shot) in the shot $S_i$ a text score $S_{t,j}$, a faces score $S_{f,j}$, a quality score $E_{f,j}$, and/or other scores may be calculated. A text score may be calculated as:

$$S_{t,j} = \frac{t_j}{\max_{1 \leq k \leq m_i} t_k};$$

where:

$$t_j = \Sigma_{b \in B_i} \text{Area}(b) * l(b) * g(b);$$

l(b) and g(b) may be factors that depend on the start frame $s_b$ and the end $e_b$ of the family the text string b belongs to;

$$l(b) = \exp\left(\frac{\frac{j - s_b}{e_b - s_b + 1} - 0.5}{2.0 * 0.5^2}\right); \text{ and}$$

$$g(b) = \begin{cases} \frac{e_b - s_b + 1}{t_4} & e_b - s_b + 1 \leq t_1 \\ 0.5 & e_b - s_b + 1 > t_2 * \text{length(Shot)} \\ 1.0 & \text{otherwise} \end{cases}.$$

The factor g may be utilized to penalize short and/or long families of text strings. The short families may be a false detection, and the families that exist during almost a majority of the shot may be less important for the selection of the key frame. The factor l may decrease the importance of a text string when it may be near a beginning or an ending frame corresponding to a family of the text string.

In some implementations, a face score may be calculated based on whether one or more important families of faces detected in a given frame have been found. If there are important families of faces belonging to a given frame, being $I_j$, a set of faces in frame, $f_j$, that belong to an important face family may be calculated by:

$$S_{f,j} = \left(\frac{r_j}{2} + \frac{1}{4}\right)\frac{|I_j|}{\max_{1\le k\le m_j}|I_k|} + \left(\frac{3}{4} - \frac{r_j}{2}\right)\frac{\sum_{f\in I_j} Q(f)}{\max_{1\le k\le m_j}\sum_{f\in I_k} Q(f)};$$

where $$r = \frac{\max_{1\le k\le m_j}(|I_j|)}{|F|},$$

and Q(f) may comprise the flattery score utilized by the feature component 110. The score, $S_{f,j}$, may prioritize getting one or more the important faces of a shot in a selected key frame. In some implementations, the score, $S_{f,j}$ may give more importance to the flattering faces.

In some implementations, if no face family has been detected as important, a face score may be calculated as:

$$S_{f,j} = \frac{\sum_k \text{score}(\text{Face}_{jk})}{\max_j \sum_k \text{score}(\text{Face}_{jk})} * 0.3 + \frac{|f_j|}{\max_j |f_j|} * 0.7.$$

In some implementations, a quality score may be calculated by applying a filter to a grayscale version of the frame, $f_i'$. The filter may be a laplacian filter such as:

$$l_i = f_i' * \begin{pmatrix} 0 & 1 & 0 \\ 1 & -4 & 1 \\ 0 & 1 & 0 \end{pmatrix};$$

where "*" may denote a convolution operator.

In some implementations, for individual frames of a given shot, an energy score may be calculated as the mean of the squared values of the resulting pixels:

$$e_i = \frac{1}{\#l_i}\sum_{p\in l_i} p^2.$$

In some implementations, the quality score of a frame may then be calculated as:

$$S_{e,i} = \frac{e_i}{\max_{1\le j\le i}(e_j)}.$$

In some implementations, the final frame score, $S_i$, for a given frame may be calculated as:

$S_i = w_f * S_{f,i} + w_t * S_{t,i} + w_e * S_{e,i};$ where $w_f$, $w_t$, $w_e$ may be weights that change the relative importance of the different scores. The key frame component 114 may be configured to select an individual frame for an individual shot based on the final frame scores determined for individual ones of the frames of that shot, and/or other information. By way of non-limiting example, the frame with the highest final frame score may be selected as a key frame.

By way of non-limiting illustration in FIG. 2, the key frame component 114 may be configured such that the first frame 214 may be selected as a first key frame 230 of the first shot 208, the second frame 220 may be selected as a second key frame 232 of the second shot 210, and/or other frames of other shots of the first video may be selected as other key frames 234 of the other shots 212 of the first video 202. In some implementations, the key frame component 114 may be configured to determine a first frame score (not shown in FIG. 2) for the first frame 214, and/or other frame scores for other frames of the first video 202. The key frame component 114 may be configured such that the first frame 214 may be selected as the first key frame 230 of the first shot 208 based on the first score conveying that the first frame 214 provides a best representation of the first feature 216 and/or other features of the first shot 208.

Returning to FIG. 1, the storyboard component 116 may be configured to effectuate presentation of the key frames in storyboard interfaces corresponding to individual ones of the videos. In some implementations, a given storyboard interface may display the key frames of a given video in a chronological order of the corresponding shots. Key frames of grouped shots may be spatially correlated within a given storyboard interface.

By way of non-limiting example, an individual storyboard interface may include a two dimensional array. The two dimensional array may include a time-dependent dimension, a group-dependent dimension, and/or other dimensions. A chronological order of the shots of a given video may be represented by positions of key frames of the video with respect to the time-dependent dimension of a corresponding storyboard interface. A grouping of the shots of a given video may be visually represented by spatial positions of the key frames of the given video with respect to the group-dependent dimension. By way of non-limiting example, groupings of shots may be represented by in-line positioning of corresponding key frames of the shots in the storyboard interface. In some implementations, a storyboard interface may include a time-dependent dimension and an orthogonally opposed group-dependent dimension (see, e.g., FIG. 4).

Figure 4:
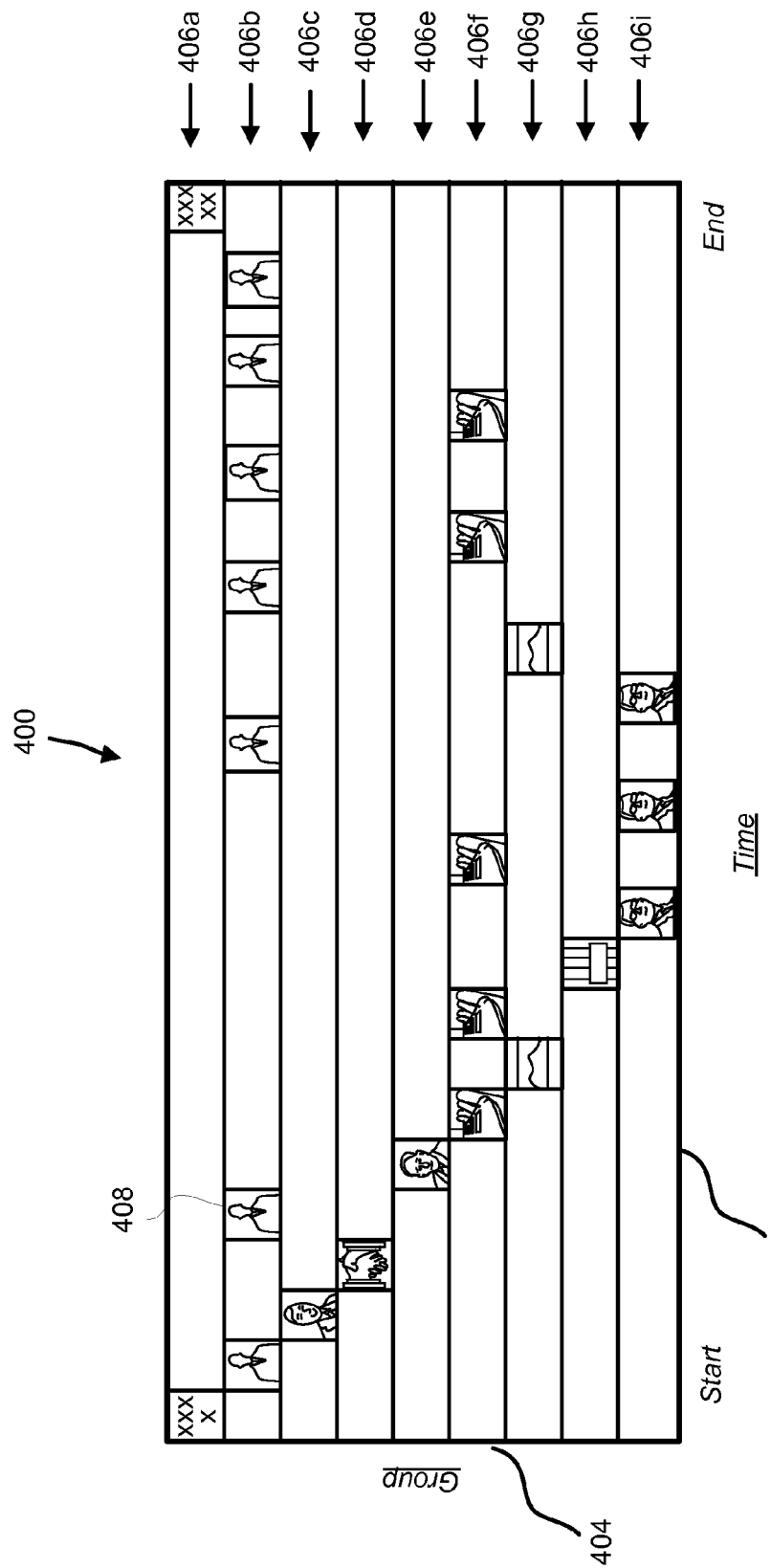
FIG. 4 illustrates an exemplary storyboard interface corresponding to a video, in accordance with one or more implementations.

By way of non-limiting illustration in FIG. 4, an exemplary storyboard interface 400 is depicted. The storyboard interface 400 may include a time-dependent dimension 402, a group-dependent dimension 404, and/or other components. A chronological order of the shots of a given video may be represented by positions of key frames 408 of the video with respect to the time-dependent dimension 402. For example, time-dependent dimension 402 may include a "start" end and/or an "end" end to represent the chronological order of the shots corresponding to the depicted key frames 408. A grouping of the shots of the given video may be visually represented by spatial positions of the key frames 408 with respect to the group-dependent dimension 404. By way of non-limiting example, a given group of shots may be represented by in-line positioning of the key frames of the shots of the given group in the storyboard interface. By way of non-limiting example, grouped shots may be represented by in-line positioning of corresponding key frames 408 along individual rows 406a-i of the storyboard interface 400. Individual ones of the rows 406a-i may represent individual groups of shots.

One or more implementations of a storyboard interface may provide an intuitive view of a corresponding video. For example, patterns in groupings of key frames may be utilized to distinguish one type of video from another; determine what shots and/or group of shots include particular actors (e.g., interviewee versus interviewer, and/or other actors), scenes, and/or other features; and/or to determine other information about a given video. By way of non-limiting example, types of video may include an interview and/or news program, an action sports montage, a music video, and/or other types of video.

By way of non-limiting example, an interview and/or news program may be distinguishable from other video types based on patterns of key frames presented in a corresponding storyboard interface. In such videos, the key frames presented in a storyboard interface may alternate between different groups of key frames and a common group of key frames. For example, one or more groups of key frames may represent shots where various persons may be interviewed. A common group of key frames may represent a news anchor in a news room. A pattern of key frames alternating from one or more groups to a common group may represent a consistent pattern in the interview process where the camera cuts from shots of those being interviewed to a central shot the news room. When a user ascertains that a common group of shots is present, the user may be able to further ascertain the individuals who may be the interviewers (e.g., news anchors) in the video.

By way of non-limiting example, a music video may be distinguishable from other video types based on patterns of key frames presented in a corresponding storyboard interface. In such videos, the key frames presented in a storyboard interface may alternate between wide angle frames depicting a group of actors, close-up shots depicting a head shot of a single actor, and/or other key frames. For example, the wide angle frames may represent views of a band. Close-up shots may represent views of individual band members. A user viewing the storyboard interface may further be able to determine which shots show the band leader due to, for example, a group of close-up key frames including the most amount of key frames relative other groups of key frames.

By way of non-limiting illustration in FIG. 2, the storyboard component 116 may be configured to effectuate presentation of the first key frame 230, the second key frame 232, and/or other key frames of the first video 202 in a first storyboard interface 236. The first key frame 230 and/or other key frames of other shots assigned to the first group 226 may be spatially correlated within the display of the first storyboard interface 236. By way of non-limiting example, the first key frame 230 may be posited in-line with key frames of others shots assigned to the first group 226. In some implementations, the first storyboard interface 236 may comprise a two-dimensional array. The first storyboard interface 236 may include a time-dependent dimension 238, a group-dependent dimension 240, and/or other dimensions. The storyboard component 116 may be configured to effectuate presentation of other storyboard interfaces 242 corresponding to other videos 206.

Returning to FIG. 1, the server 102, computing platforms 122, and/or external resources 124 may be operatively linked via one or more electronic communication links. For example, such electronic communication links may be established, at least in part, via a network 121 such as the Internet and/or other networks. It will be appreciated that this is not intended to be limiting and that the scope of this disclosure includes implementations in which server 102, computing platforms 122, and/or external resources 124 may be operatively linked via some other communication media.

The external resources 124 may include sources of information, hosts, and/or providers of virtual spaces outside of system 100, external entities participating with system 100, external entities for player-to-player communications, and/or other resources. In some implementations, some or all of the functionality attributed herein to external resources 124 may be provided by resources included in system 100.

The server 102 may include electronic storage 118, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor 104, information received from server 102, information received from computing platforms 122, and/or other information that enables server 102 to function as described herein.

Processor(s) 104 is configured to provide information-processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 108, 110, 112, 114, and/or 116. Processor 104 may be configured to execute components 108, 110, 112, 114, and/or 116 by software; hardware; some combination of software, hardware, and/or firmware; and/or other mechanisms for configuring processing capabilities on processor 104.

It should be appreciated that although components 108, 110, 112, 114, and/or 116 are illustrated in FIG. 1 as being co-located within a single processing unit, in implementations in which processor 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor 104 may be configured to execute one or more additional components that may perform some or all of the functionality attributed below to one of components 108, 110, 112, 114, and/or 116.

Figure 5:
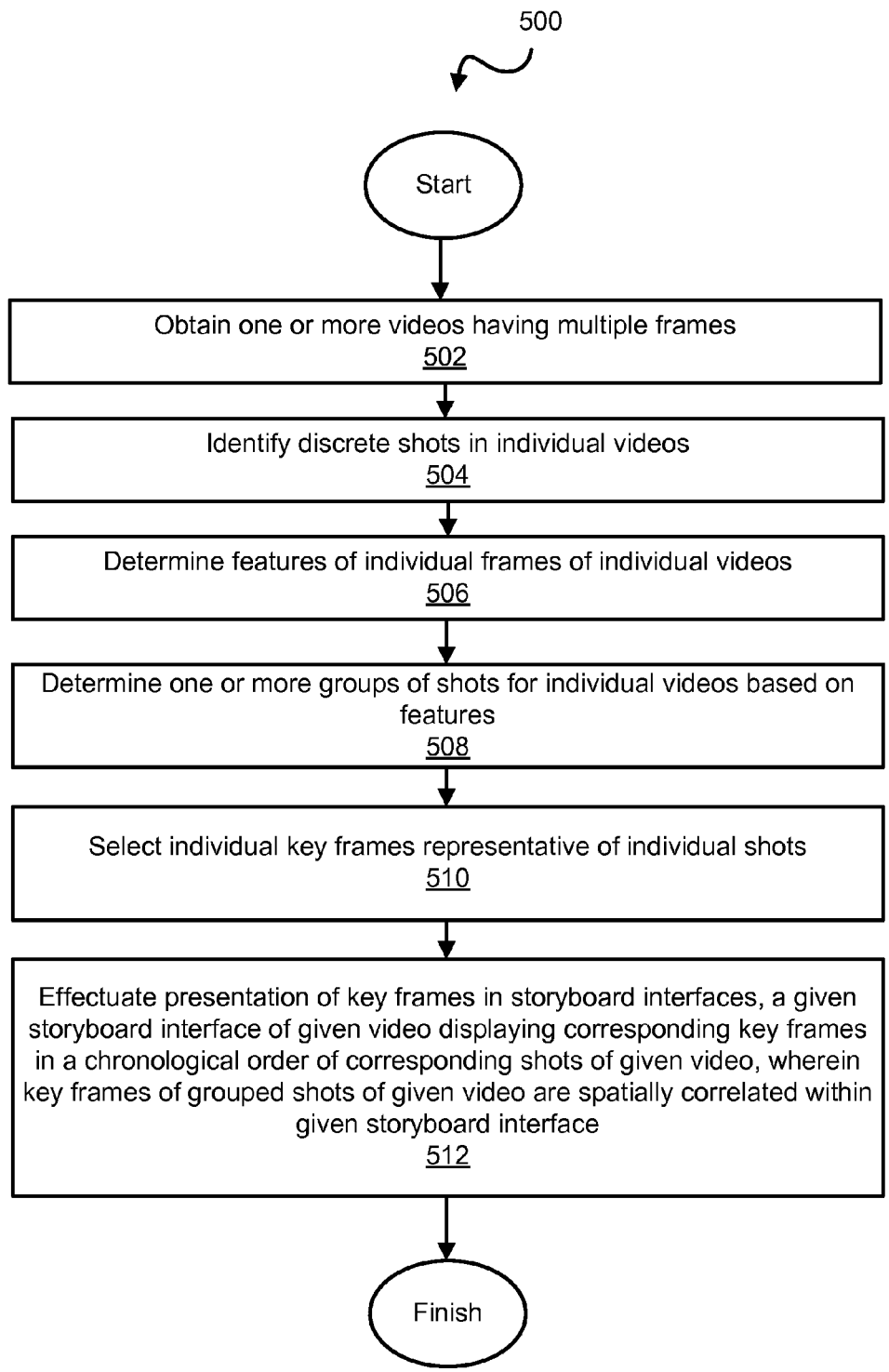
FIG. 5 illustrates a method of automatic key frame extraction and storyboard interface generation for video, in accordance with one or more implementations.

FIG. 5 illustrates a method 500 of automatic key frame extraction and storyboard interface generation for videos. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on electronic storage medium. The one or more processing devices may include one or more devices configured through hardware, firmware, and/or software to be specifically designed for execution of one or more of the operations of method 500.

At an operation 502, one or more videos having multiple frames may be obtained. The obtained videos may include a first video having a first set of frames. In some implementations, operation 502 may be performed by one or more physical processor executing a shot component that is the same as or similar to shot component 108 (shown in FIG. 1 and described herein).

At an operation 504, discrete shots in the individual videos may be identified. A given shot in a given video may include consecutive frames of the given video. By way of non-limiting example, a first shot and a second shot of the first video may be identified. In some implementations, operation 504 may be performed by one or more physical processors executing a shot component that is the same as or similar to the shot component 108 (shown in FIG. 1 and described herein).

At an operation 506, features of individual frames may be determined. In some implementations, operation 506 may be performed by one or more physical processors executing a feature component that is the same as or similar to the feature component 110 (shown in FIG. 1 and described herein).

At an operation 508, one or more groups of shots for individual videos may be determined based on the determined features of individual frames. A given group may include one or more shots of a given video having the same or similar features. By way of non-limiting example, responsive to determining that a first frame of the first shot includes a first feature and a second frame of the second shot includes a second feature, determining that the first shot is assigned to a first group based on the first feature being similar to other features of other shots assigned to the first group, and determining that the second shot is assigned to a second group based on the second feature being different from the first feature. In some implementations, operation 508 may be performed by one or more physical processors executing a group component that is the same as or similar to the group component 112 (shown in FIG. 1 and described herein).

At an operation 510, individual key frames representative of the individual shots may be identified. By way of non-limiting example, the first frame may be selected as a first key frame of the first shot, the second frame may be selected as a second key frame of the second shot, and/or other frames may be selected as other key frames of other shots. In some implementations, operation 510 may be performed by one or more physical processors executing a key frame component that is the same as or similar to the key frame component 114 (shown in FIG. 1 and described herein).

At an operation 512, presentation of the key frames in storyboard interfaces may be effectuated. A given storyboard interface of given video may display corresponding key frames in a chronological order of the corresponding shots of the given video. Key frames of grouped shots of the given video may be spatially correlated within the given storyboard interface. By way of non-limiting example, the first key frame and the second key frame may be presented in a first storyboard interface. The first key frame and/or other key frames of other shots assigned to the first group may be spatially correlated in the first storyboard interface. In some implementations, operation 512 may be performed by one or more physical processors executing a storyboard component that is the same as or similar to the storyboard component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for automatic key frame extraction and storyboard interface generation for videos, the system comprising:
    one or more physical processors configured by machine-readable instructions to:
    obtain one or more videos having multiple frames, individual ones of the obtained one or more videos including a first video having a first set of frames;
    identify discrete shots in the individual videos, a given shot in a given video including consecutive frames of the given video, the identified discrete shots in the first video including a first shot and a second shot;
    determine features of individual frames;
    determine two or more groups of shots for individual videos based on the determined features, a given group including one or more shots of a given video sharing similar features, such that responsive to a determination of a first frame of the first shot including a first feature and a second frame of the second shot including a second feature, the first shot is assigned to a first group based on the first feature being similar to other features of other shots assigned to the first group, and the second shot is assigned to a second group based on the second feature being different from the first feature;

select individual key frames representative of the individual shots, the first frame being selected as a first key frame of the first shot, and the second frame being selected as a second key frame of the second shot;

effectuate presentation of the key frames in storyboard interfaces, a given storyboard interface of given video displaying corresponding key frames in a chronological order of the corresponding shots of the given video, wherein key frames of grouped shots of the given video are spatially correlated within the given storyboard interface, including effectuating presentation of the first key frame and the second key frame in a first storyboard interface, wherein the first key frame and other key frames of other shots assigned to the first group are spatially correlated in the first storyboard interface, such that an individual storyboard interface includes a two dimensional array, the array including a time-dependent dimension and a group-dependent dimension, wherein the chronological order of the shots of a given video is represented by positions of the key frames with respect to the time-dependent dimension and the grouping of the shots is represented by positions of the key frames with respect to the group-dependent dimension.

2. The system of claim 1, wherein the one or more physical processors are further configured by machine-readable instructions such that the groupings of shots are represented by in-line positioning of the key frames of the given shots of a corresponding group in a given storyboard interface.

3. The system of claim 1, wherein the one or more physical processors are further configured by machine-readable instructions such that determining one or more groups includes determining similarity of features between pairs of shots and assigning similar pairs to a common group and dissimilar pairs to separate groups.

4. The system of claim 3, wherein the one or more physical processors are further configured by machine-readable instructions such that determining similarity between pairs comprises:

selecting one or more sample frames from individual shots;

comparing features of selected one or more sample frames between a given pair of shots;

determining, based on the comparison, whether the given pair of shots are similar, such that:
  based on a comparison of features of respective one or more sample frames of the given pair of shots conveying similarity, the given pair of shots are assigned to a given group, or
  based on a comparison of features of respective one or more sample frames of the given pair of shots conveying dissimilarity, individual shots in the given pair are assigned to separate groups.

5. The system of claim 1, wherein the one or more physical processors are further configured by machine-readable instructions such that identifying one or more discrete shots comprises determining a starting frame comprising a beginning of an individual shot and/or an ending frame comprising an ending of an individual shot, wherein determining starting and/or ending frames is based on detected triggers in the video.

6. The system of claim 4, wherein the one or more physical processors are further configured by computer-readable instructions such that triggers in the video include one or more of a fade-in transition, a fade-out transition, or an abrupt cut.

7. The system of claim 1, wherein the one or more physical processors are further configured by machine-readable instructions such that features of an individual frame include one or more of a size, position, and/or angle of individual faces; a state of a mouth and/or eyes of a given face; an importance score assigned to a given face; text displayed; an image quality; or a perspective of a video recording device capturing an image corresponding to a given frame.

8. The system of claim 1, wherein the one or more physical processors are further configured by machine-readable instructions such that selecting individual key frames representative of individual shots comprises:

determining frame scores for individual frames, a given frame score conveying a quality of a given frame for representing a corresponding shot, a first score determined for the first frame, wherein the first frame is selected as the first key frame of the first shot based on the first score conveying that the first frame provides a best representation of the first shot.

9. The system of claim 8, wherein the one or more physical processors are further configured by computer-readable instructions such that individual frame scores are determined based on one or more of faces detected in a given frame, text detected in the given frame, or an image quality of the given frame.

10. A method of automatic key frame extraction and storyboard interface generation for videos, the method being implemented in a computer system including one or more physical processors and storage media storing machine-readable instructions, the method comprising:

obtaining one or more videos having multiple frames, individual ones of the obtained one or more videos including a first video having a first set of frames;

identifying discrete shots in the individual videos, a given shot in a given video including consecutive frames of the given video, including identifying a first shot and a second shot of the first video;

determining features of individual frames;

determining two or more groups of shots for individual videos based on the determined features, a given group including one or more shots of a given video sharing similar features, such that responsive to a determination that a first frame of the first shot includes a first feature and a second frame of the second shot includes a second feature, determining that the first shot is assigned to a first group based on the first feature being similar to other features of other shots assigned to the first group, and determining that the second shot is assigned to a second group based on the second feature being different from the first feature;

selecting individual key frames representative of the individual shots, including selecting the first frame as a first key frame of the first shot, and the second frame as a second key frame of the second shot;

effectuating presentation of the key frames in storyboard interfaces, a given storyboard interface of given video displaying corresponding key frames in a chronological order of the corresponding shots of the given video, wherein key frames of grouped shots of the given video are spatially correlated within the given storyboard interface, including effectuating presentation of the first key frame and the second key frame in a first storyboard interface, wherein the first key frame and other key frames of other shots assigned to the first group are spatially correlated in the first storyboard interface, such that an individual storyboard interface includes a two dimensional array, the array including a time-dependent dimension and a group-dependent dimension, wherein the chronological order of the shots of a given video is represented by positions of the key frames with respect to the time-dependent dimension and the grouping of the shots is represented by positions of the key frames with respect to the group-dependent dimension.

11. The method of claim 10, wherein the groupings of shots are represented by in-line positioning of the key frames of the given shots of a corresponding group in the storyboard interface.

12. The method of claim 10, wherein determining one or more groups includes determining similarity of features between pairs of shots and assigning similar pairs to a common group and dissimilar pairs to separate groups.

13. The method of claim 12, wherein determining similarity between pairs comprises:
   selecting one or more sample frames from individual shots;
   comparing features of selected one or more sample frames between a given pair of shots;
   determining, based on the comparison, whether the given pair of shots are similar, such that:
      based on a comparison of features of respective one or more sample frames of the given pair of shots conveying similarity, determining that the given pair of shots are assigned to a given group, or
      based on a comparison of features of respective one or more sample frames of the given pair of shots conveying dissimilarity, determining that individual shots in the given pair are assigned to separate groups.

14. The method of claim 10, wherein identifying one or more discrete shots comprises determining a starting frame comprising a beginning of an individual shot and/or an ending frame comprising an ending of an individual shot, wherein determining starting and/or ending frames is based on detected triggers in the video.

15. The method of claim 13, wherein triggers in the video include one or more of a fade-in transition, a fade-out transition, or an abrupt cut.

16. The method of claim 10, wherein features of an individual frame include one or more of a size, position, and/or angle of individual faces; a state of a mouth and/or eyes of a given face; an importance score assigned to a given face; text displayed; an image quality; or a perspective of a video recording device capturing an image corresponding to a given frame.

17. The method of claim 10, wherein selecting individual key frames representative of individual shots comprises:
   determining frame scores for individual frames, a given frame score conveying a quality of a given frame for representing a corresponding shot, including determining a first score for the first frame, wherein the first frame is selected as the first key frame of the first shot based on the first score conveying that the first frame provides a best representation of the first shot.

18. The method of claim 17, wherein individual frame scores are determined based on one or more of faces detected in a given frame, text detected in the given frame, or an image quality of the given frame.

* * * * *